United States Patent

[11] 3,582,728

[72] Inventor Paul E. Thoma
 Burlington, Wis.
[21] Appl. No. 804,792
[22] Filed Mar. 6, 1969
[45] Patented June 1, 1971
[73] Assignee Johnson Service Company
 Milwaukee, Wis.

[54] CAPACITANCE HUMIDITY SENSING ELEMENT
 15 Claims, 6 Drawing Figs.
[52] U.S. Cl. ...................................................... 317/246,
 73/336.5
[51] Int. Cl. ....................................................... H01g 7/00,
 G01n 27/22
[50] Field of Search ........................................... 73/336.5,
 73/73; 317/246

[56] References Cited
 UNITED STATES PATENTS
3,192,426 6/1965 Feuer ........................... 73/336.5X
3,315,518 4/1967 Charlson ...................... 73/336.5X
3,350,941 11/1967 Misevich ...................... 73/336.5

*Primary Examiner*—Louis R. Prince
*Assistant Examiner*—Denis E. Corr
*Attorney*—Andrus, Sceales, Starke & Sawall ABSTRACT: A capacitance synthetic humidity sensing element comprising a moisture sensitive dielectric core and having electrode layers integrally bonded to opposite surfaces of the core. Each electrode layer consists of a matrix of a dielectric, moisture-permeable material, and a plurality of interconnected electrically conductive particles are dispersed within the matrix. The element is supported within a central opening of a frame, and the frame includes an electrically conductive section which is in electrical contact with the electrode layers. At least one of the electrode layers is exposed completely to the environment being sensed. Changes in relative humidity provide changes in capacitance and this can be converted into a signal to indicate the relative humidity or to operate a humidity control system.

PATENTED JUN 1 1971

3,582,728

Glass Plate
First Electrode Layer
Core Layer
Second Electrode Layer

INVENTOR.
Paul E. Thoma
BY
Andrus, Sceales, Starke & Sawall
Attorneys

3,582,728

CAPACITANCE HUMIDITY SENSING ELEMENT

This invention relates to an improved capacitance humidity sensing element for use in a humidity control and/or humidity indication system.

Humidity sensing elements of the electrical capacitance type are sensitive to changes in the moisture content of the air and respond in the form of a change in capacitance to variations in humidity. U.S. Pat. Ser. No. 3,350,941 relates to a capacitance humidity sensing element comprising a moisture-insensitive, nonmetallic core having a high electrical resistivity and a low dielectric constant. Thin layers or coatings of a dielectric, moisture-sensitive material are bonded to opposite surfaces of the core and a porous layer of an electrically conductive material, such as carbon black, is applied to the outer surface of each of the moisture-sensitive layers. The porous nature of the electrically conductive material permits water vapor to penetrate and diffuse onto the moisture-sensitive layers. With an element as shown in the aforementioned patent, changes in relative humidity provide a change in capacitance which can be converted into a signal to indicate the relative humidity or operate a humidity control system.

The present invention is directed to a further development of the capacitance humidity sensing element as shown in U.S. Pat. Ser. No. 3,350,941. According to the invention, the element comprises a moisture-sensitive, dielectric core and electrode layers are integrally bonded to opposite surfaces of the core. Each electrode layer consists of a matrix of a dielectric, moisture-permeable material, and a plurality of interconnected, electrically conductive particles, such as graphitized carbon, are dispersed within the electrode layers.

The element is supported within the central opening in a frame, and the frame includes a pair of electrically conductive rings, each of which is in electrical contact with an electrode layer and is adapted to be connected in an electrical circuit. At least one of the electrode layers is completely exposed to the environment being sensed.

With the humidity sensing element of the invention, changes in relative humidity provide changes in capacitance of the element and this can be converted to a signal to indicate the relative humidity directly or to operate a humidity control system.

The humidity sensing element of the invention is relatively simple to manufacture and is low in cost.

Due to the fact that the electrically conductive particles are embedded in the outer layers, the electrode layers are more stable, for the particles cannot be accidentally rubbed off or displaced from the element.

As a further advantage, the element has a relatively low electrical resistance which is reproducible from element-to-element.

The element of the invention is an approximately pure capacitance element which significantly reduces the dissipative effect present in prior art types of capacitance humidity sensing elements. The element will give a fast and precise indication of humidity in the range of 5 percent to 95 percent relative humidity and the element will not be damaged by humidity extremes.

Other objects and advantages will appear in the course of the following description.

The drawings illustrate the best mode presently contemplated of carrying out the invention.

Figure 1:
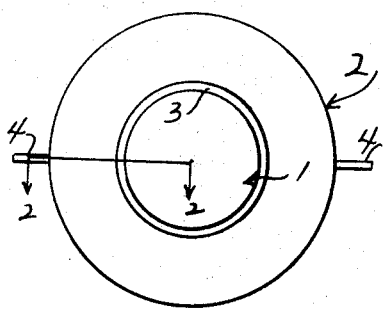
FIG. 1 is a plan view of the capacitance humidity sensing element of the invention.
Figure 2:
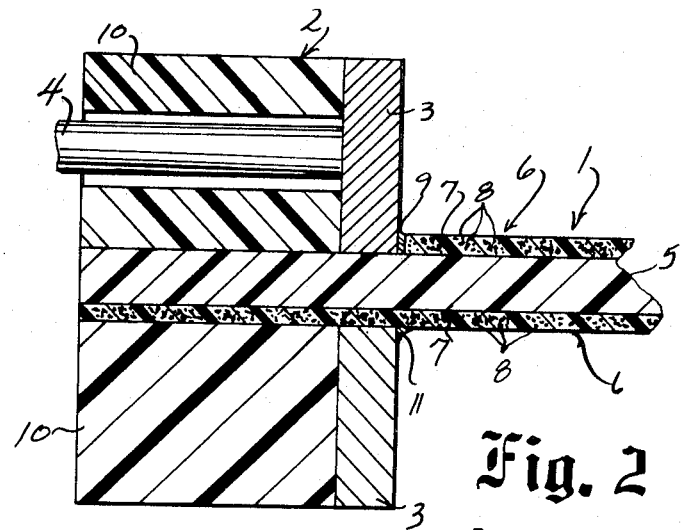
FIG. 2 is a section taken along lines 2-2 of FIG. 1.

FIGS. 1 and 2 illustrate a capacitance humidity sensing element 1 which is supported in an annular, electrically insulating frame 2. As best shown in FIG. 2, the frame 2 includes a pair of inner, electrically conductive rings 3, formed of copper, or the like, which are in electrical contact with the element 1, and leads 4 extend through the frame 2 and are connected to the conducting rings 3.

According to the invention, the element 1 comprises a sheetlike core 5 of dielectric material which is sensitive to moisture conditions, and electrode layers 6 are integrally bonded to opposite faces of the core 5. Each electrode layer comprises a matrix of a dielectric, moisture-permeable material 7 and a plurality of interconnected, electrically conductive particles 8 are dispersed within the matrix 7. The core 5 and matrix 7 are capable of absorbing at least 1 percent, based on their dry weight, of moisture when exposed to 95 percent relative humidity at 70° F. in a period of one-half hour, the dry weight to be measured at less than 5 percent relative humidity and 70° F.

In addition, the core 5 and matrix 7 should have a dielectric constant less than 10 and generally in the range of 1.1 to 8 at relative humidities of 5 percent and less, and the core 5 and matrix 7, at a relative humidity of 80 percent, should have a dielectric constant at least 1.25 times the dielectric constant of the dry material.

The core 5 and matrix 7 also have a high electrical resistivity, above $1 \times 10^9$ ohm inches.

In most cases the matrix 7 of electrode layers 6 will be formed of materials which have the same moisture sensitivity as the materials of core 5, but in some instances the matrix 7 may be more moisture sensitive than the core or may be less moisture sensitive than the core. More specifically, the core 5 and the matrix 7 of electrode layers 6 can be composed of materials such as cellulose esters in which the esterifying acids contain up to 20 carbon atoms, and preferably up to 6 carbon atoms, such as cellulose acetate, cellulose acetate-butyrate, cellulose acetate-propionate, cellulose acetate-valerate, and cellulose succinate; cellulose, ethyl cellulose; methyl cellulose; gelatin; polyvinyl alcohol; polyacrylamide; polyacrylic acid; keratin; collagen; starch and starch derivatives; regenerated protein such as casein and zein; and synthetic polymers such as polyvinyl pyrrolidone and nylon.

In addition, the core 5 and matrix 7 of electrode layers 6 can be formed of crosslinked materials such as those disclosed in copending U.S. Pat. application Ser. No. 652,287, filed July 10, 1967, now U.S. Pat. Ser. No. 3,461,723 of the same inventor. More specifically, the crosslinked material is formed by the reaction of a compound containing glucoside chains, such as a cellulosic material, and a stabilizing monomer or partial polymer capable of reacting with the hydroxyl groups of the glucosides. The glucoside-containing compound can be cellulose or a cellulose ester in which the esterifying acids contain up to 20 carbon atoms and preferably up to 6 carbon atoms. Specific examples are cellulose nitrate, cellulose triacetate, cellulose butyrate, cellulose propionate, cellulose succinate, cellulose phthalate, or the like. Mixed cellulose esters such as cellulose acetate-butyrate, cellulose acetate-propionate, cellulose ethers in which the etherifying alcohol contains up to 8 carbon atoms, such as ethyl cellulose, methyl cellulose, hydroxypropylmethylcellulose, and hydroxybutylmethylcellulose can also be employed. The stabilizing monomer or partial polymer can take the form of urea-formaldehyde, phenol-formaldehyde, melamine-formaldehyde, triazine-formaldehyde, hexamethoxymethylmelamine, glyoxal, 2-hydroxyadipaldehyde and the like.

The electrically conductive particles 8 can be formed of any electrically conductive material, such as carbon, zinc, aluminum, or the like, but preferably the particles 8 are formed of graphitized carbon such as disclosed in copending U.S. application Ser. No. 776,342 filed Nov. 18, 1968. Graphitized carbon is a unique form of carbon combining uniform surface with high surface area. The carbon particles are graphitized by heating in the absence of air at temperatures above 1700° C. and generally in the range of 2700° to 3000° C.

Graphitized carbon is hydrophobic, meaning that it will adsorb and/or absorb less than 4 percent by weight of water at 78° F. with relative humidity changes from 0 percent to 90 percent, and preferably will absorb less than 1 percent water under these conditions. The graphitized carbon can be present in an amount up to 75 percent, and generally in the range of 25 percent to 60 percent, by weight of the electrode layers 6.

The thickness of the core has a relation to the thickness of the electrode layers. The core 5 generally has a thickness less than 0.002 inch and each electrode layer 6 should be at least 5 percent of the overall thickness of the composite structure and each electrode layer should preferably be between 10 percent to 40 percent of the thickness of the composite structure depending on the sensitivity, response time, and resistance required in the element.

The core 5 and electrode layers 6 are bonded together throughout their extent and various methods may be employed to provide the bond between the members. For example, the electrode layers 6 can be applied by coating the core 5 with a solvent solution of the matrix 7 containing the particles 8, and subsequently evaporating the solvent, or the electrode layers 6 can be bonded to the core 5 by use of auxiliary adhesives.

As best shown in FIG. 2, one of the electrode layers 6 is exposed completely to the environment to be sensed and is not, in itself, clamped to the frame. As shown in FIG. 2, the periphery of the electrode layer which is coextensive with the opening in frame 2, is connected by an electrically conductive coating 9, such as silver paint, to one of the conductive rings 3 on the frame. The electrode layer 6 on the opposite surface of the core 5, however, is coextensive with the core and extends with the core between the sections 10 of the frame 2. An electrically conductive coating 11, such as silver paint can be applied to the joint between the electrode layer and the other ring 3.

The frame sections 10 can be connected together by clamps, fasteners, or adhesives, or alternately, if the frame sections are formed of solvent fusible materials, a solvent can be applied to the outer periphery of the frame sections and to the exposed peripheral edges of the core and electrode layer 6 to dissolve a portion of the surface, and on evaporation of the solvent, a firm bond will result between the members.

It is necessary that at least one of the electrode layers 6 should be completely exposed to the environment being sensed, as shown in FIG. 2. If the element is constructed with both electrode layers 6 extending between and in contact with the nonconducting frame sections 10, a change in the relative humidity may cause a slow element response due to the slow transfer of moisture through the film between the nonconducting frame sections. Therefore, it is important that at least one of the electrode layers be completely exposed to the environment being sensed.

With the element shown in FIGS. 1 and 2, the moisture in the atmosphere will penetrate through the electrode layers 6 and will be absorbed within the moisture-sensitive core 5. Absorption of moisture in the core, will cause a change in capacitance in the element.

Figure 3:
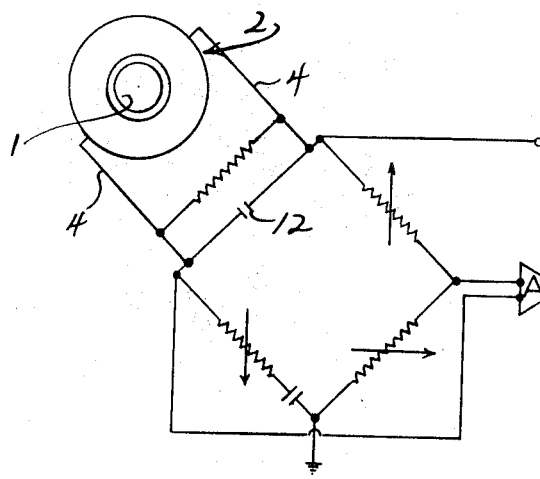
FIG. 3 is an electric circuit showing a typical manner in which the element can be connected in a humidity indication system.

The humidity sensing element can be connected in any AC or bridge circuit or charge time circuit which will measure capacitance and convert this to an electrical signal which can then be read on an indicator or be used to actuate a humidity control system. As shown in FIG. 3, the humidity sensing element 1 is connected across a capacitor 12 in a leg of a modified Wien bridge and the output of the bridge is connected through an amplifier 13 to a meter 14 which is calibrated to indicate the relative humidity.

Figure 4:
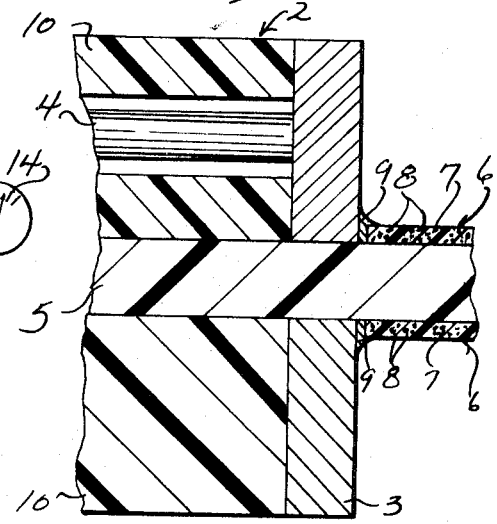
FIG. 4 is a view similar to FIG. 2 showing a modified form of the invention.

FIG. 4 illustrates a modified form of the invention in which both of the electrode layers 6 are exposed completely to the environment to be sensed. In this case only the core 5 extends between the sections 10 of the frame 2 and the periphery of each electrode layer terminates adjacent the conducting ring 3. As in the case of the first embodiment, a layer 9 of an electrically conductive material, such as silver paint, is applied to the joint between each layer 6 and ring 3 to provide a positive electrical connection between the members.

Figure 5:
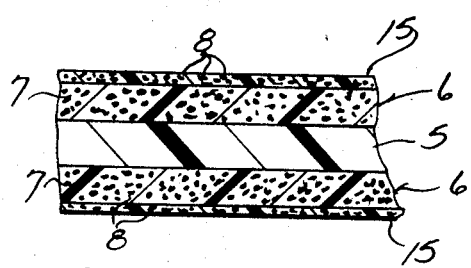
FIG. 5 is a fragmentary enlarged section showing a modified form of the invention wherein the humidity sensing element has hydrolyzed surface layers.

The sensitivity to moisture and rate of response of the capacitance humidity sensing element can be increased by hydrolyzing the outer surface of the matrix 7 of the electrode layer 6, as illustrated in FIG. 5, to provide a hydrolyzed layer 15. If the matrix 7 is formed of a cellulose ester, the outer surface can be hydrolyzed to regenerated cellulose to increase the sensitivity to moisture and rate of response. The cellulose ester matrix 7 can be subjected to the influence of either an alkaline or acid medium to hydrolyze substantially all of the acid radicals in the surface layer to thereby obtain the regenerated cellulose film which provides a maximum moisture sensitivity. The hydrolyzation can be accomplished by dipping the element into an alkaline or acid bath and maintaining it in the bath for a period of time sufficient to hydrolyze the acid groups on the surface of the matrix 7. Alkaline materials which can be employed for the hydrolyzation are aqueous or alcoholic solutions of alkali metal bases such as sodium hydroxide, potassium hydroxide, or lithium hydroxide. Alternately, alcoholic solutions of strong organic bases such as tetramethyl guanidine, triethylamine, benzyltrimethyl ammonium hydroxide can also be used for the hydrolyzation.

Hot alkaline solutions are preferred to increase the reaction rate. The time of contact or immersion in the alkaline solution depends on the materials used, the temperature and strengths of the solution. The most effective reaction conditions were found to be obtained by immersing the element in a 230° F. 40 percent sodium hydroxide solution for a period of 1 to 4 minutes depending on the desired layer thickness.

After the hydrolyzation the element is preferably rinsed in water to remove and dilute the alkaline residue.

Solutions of mineral acids such as hydrochloric acid and sulfuric acid can also be used to provide the hydrolyzed surface layer 15. However, the use of alkaline materials provide a faster hydrolyzation and are preferred.

The hydrolyzation treatment can also be employed to provide increased moisture sensitivity for a matrix consisting of other materials, such as for example, a copolymer of vinylene carbonate and vinyl acetate.

The humidity sensing element of the invention is an approximately pure capacitance element which will normally provide a 0.1 percent to 2.0 percent capacitance change with 1 percent change in relative humidity at temperatures in the range of 40° F. to 200° F. The capacitance change can be varied by variations of the materials, and it is possible to design a unit having a smaller capacitance change than the range indicated above, in which case the smaller change can be amplified to provide the desired electrical signal.

The following examples illustrate the preparation of the humidity sensing element of the invention.

EXAMPLE No. 1

An electrode layer solution was prepared by mixing the following ingredients:
  7.5 grams cellulose acetate butyrate (17 percent combined butyryl)
  7.5 grams Graphon (graphitized carbon)
  130.0 grams ethylene dichloride A solvent solution of the dielectric core was prepared by mixing the following materials:
  5.0 grams cellulose acetate butyrate (26 percent combined butyryl)
  95.0 grams ethylene dichloride A film of the electrode layer solution was cast onto a clean glass plate with an adjustable strike-off bar. After evaporation of the solvent, the surface of the electrode layer was sanded until smooth. A film of the core layer solution was then cast over the first electrode layer with an adjustable strike-off bar and the solvent was evaporated from the core layer solution.

A strip of Mylar tape, with a silicone adhesive on one side, having spaced holes punched therethrough was placed over the dielectric core layer on the glass plate, with the holes in the tape defining the areas of the second electrode layer to be subsequently cast.

A film of the electrode layer solution was then cast over the Mylar tape and penetrated into the holes.

The Mylar tape was immediately removed from the composite film after casting of the second electrode layer solution. The solvent from the second electrode layer solution was then evaporated. The appearance of the three-layer film on the glass plate after the Mylar tape was removed is shown in FIG. 6.

Figure 6:
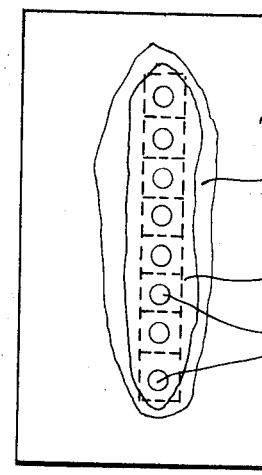
FIG. 6 is a plan view showing the method of fabricating the element.

A series of specimens or samples were then cut from the three-layer film along the dashed lines shown in FIG. 6.

Each of the resulting three-layer film assemblies was then mounted between the insulating frame sections 10 by either mechanical fasteners or solvent bonding and silver paint was applied to the joint between the copper rings 3 and the electrode layers 6.

Example No. 2

A crosslinkable dielectric core solution was prepared by mixing the following ingredients:

6.20 grams cellulose acetate butyrate (26 percent combined butyryl)
1.55 grams urea-formaldehyde monomer
0.65 grams n-butyl alcohol
0.53 grams ethyl alcohol
0.15 grams p-toluenesulfonic acid
1.60 grams triethylamine
89.32 grams ethylene dichloride An electrode layer solution was prepared by mixing the following ingredients:

7.50 grams cellulose acetate butyrate (17 percent combined butyryl)
6.00 grams Graphon (graphitized carbon)
130.00 grams ethylene dichloride The electrode layer was cast as a film on a clean glass plate with an adjustable strike-off bar. After evaporation of the solvent, the dielectric core layer was cast as a film over the dried first electrode layer. The solvents were permitted to evaporate from the film, and the core layer was crosslinked by heating the film on the glass plate to a temperature of 350° F. for 15 minutes.

After cooling, a second dielectric core layer was cast as a film over the first crosslinked core layer. After evaporation of the solvent, Mylar tape containing a series of punched holes, similar to that described in Example No. 1 was placed over the second, uncrosslinked dielectric core layer. A second electrode layer was then cast as a film over the Mylar tape and penetrated into the holes within the tape. The tape was immediately removed leaving only the portion of the electrode layer solution that penetrated through the holes of the tape.

The composite structure was then heated to a temperature of 350° F. for 15 minutes to crosslink the materials of the second core layer. The dielectric core layer was made in two layers to prevent the carbon particles from migrating through the core layer.

As described in Example No. 1, specimens or samples were then cut from the composite structure along the dashed lines as shown in FIG. 6.

The composite films, which were released from the glass plate by running cold water over the films, were then hydrolyzed by immersing them in an aqueous solution containing 40 percent sodium hydroxide at 230° F. for 1 minute. After the hydrolyzing treatment the elements were rinsed in water and dried. Each film was then assembled between two insulating sections 10 of the frame 2 and a layer of silver paint was applied between the junction of the copper rings 3 on the frame and each electrode layer 6 of the element.

The average capacitance of the elements at 5 percent relative humidity and 80° F. was 1.0 millimicrofarads. Increasing the relative humidity to 95 percent provided an approximate linear increase in capacitance at the rate of 0.006 millimicrofarads/1 percent relative humidity.

I claim:

1. A capacitance synthetic humidity sensing element, comprising a sheetlike core formed of a dielectric moisture sensitive material, a dielectric outer layer bonded to each surface of the core and being porous to the diffusion of water vapor therethrough, and a plurality of interconnected electrically conductive particles distributed within each outer layer the electrically conductive particles of each outer layer adapted to be connected in an electrical circuit, water vapor from the atmosphere penetrating said outer layers and being absorbed in said core to thereby vary the capacitance of the element.

2. The humidity sensing element of claim 1, wherein said core is capable of absorbing at least 1 percent, based on its dry weight, of moisture when exposed to 95 percent relative humidity at 70° F. for a period of 30 minutes.

3. The humidity sensing element of claim 1, wherein said electrically conductive particles comprise graphitized carbon.

4. The humidity sensing element of claim 1, wherein both the core and the outer layers are formed of organic materials.

5. The humidity sensing element of claim 4, wherein both the core and the outer layers are formed of cellulose esters.

6. The humidity sensing element of claim 1, wherein said element has 0.1 percent to 2.0 percent capacitance change with a 1 percent change in relative humidity at temperatures in the range of 40° F. to 200° F.

7. The humidity sensing element of claim 1, wherein at least one of said outer layers is formed of a cellulose ester, and said element includes a hydrolyzed film of cellulose disposed on the outer surface of said outer layer.

8. A humidity sensing assembly, comprising an electrically insulating frame having an opening therein, and a capacitance synthetic humidity sensing element extending across said opening, said element comprising a sheetlike core formed of a dielectric material having a relatively high sensitivity to moisture, and said element including an electrode layer bonded to each surface of the core, each electrode layer including a moisture permeable dielectric matrix and having a plurality of interconnected electrically conductive particles dispersed within the matrix, a first of said electrode layers extending solely within the opening of the frame, means for attaching the element to said frame, and means for connecting the electrode layers in an electric circuit.

9. The assembly of claim 8, wherein said frame is generally annular in shape and has a central opening.

10. The assembly of claim 9, wherein the periphery of said first electrode layer terminates adjacent the inner surface of said annular frame.

11. The assembly of claim 9, including a pair of electrically conductive rings disposed on the inner surface of said frame, the electrically conductive particles of each electrode layer being connected to one of said rings.

12. The assembly of claim 11, and including a coating of an electrically conductive material connecting each ring to the particles of the electrode layers.

13. The assembly of claim 8, wherein said particles are graphitized carbon capable of adsorbing and/or absorbing less than 4 percent by weight of water at 78° F. with relative humidity changes from 0 percent to 90 percent.

14. The assembly of claim 8, wherein both the core and the matrix having a dielectric constant in the range of 1.1 to 10 and a high electric resistivity above $1 \times 10^9$ ohm inches.

15. The assembly of claim 8, wherein said core is capable of absorbing at least 1 percent, based on its dry weight, of moisture when exposed to 85 percent relative humidity at 70° F. for a period of 30 minutes.

UNITED STATES PATENT OFFICE
CERTIFICATE OF CORRECTION

Patent No. 3,582,728      Dated  June 1, 1971.

Inventor(s)  Paul E. Thoma

It is certified that error appears in the above-identified patent and that said Letters Patent are hereby corrected as shown below:
Column 3, line 2  Cancel "1700°" and substitute therefor ---2700°---.

Signed and sealed this 14th day of December 1971.

(SEAL)
Attest:

EDWARD M. FLETCHER, JR.        ROBERT GOTTSCHALK
Attesting Officer              Acting Commissioner of Patents